June 16, 1953 H. W. HELDING 2,641,853

COLOR ANALYZING AND SYNTHESIZING DEVICE

Filed July 16, 1949 5 Sheets-Sheet 1

Inventor
Herbert W. Helding
By J. Irving Silverman
Attorney

June 16, 1953 H. W. HELDING 2,641,853

COLOR ANALYZING AND SYNTHESIZING DEVICE

Filed July 16, 1949 5 Sheets-Sheet 2

Inventor
Herbert W. Helding
By J. Irving Silverman
Attorney

COLOR ANALYZING AND SYNTHESIZING DEVICE

Filed July 16, 1949 5 Sheets-Sheet 3

Inventor:
Herbert W. Helding
By J. Irving Silverman
Attorney.

June 16, 1953 H. W. HELDING 2,641,853

COLOR ANALYZING AND SYNTHESIZING DEVICE

Filed July 16, 1949 5 Sheets-Sheet 4

Inventor
Herbert W. Helding
By I. Irving Silverman
Attorney

June 16, 1953 H. W. HELDING 2,641,853

COLOR ANALYZING AND SYNTHESIZING DEVICE

Filed July 16, 1949 5 Sheets-Sheet 5

Inventor
Herbert W. Helding
By I. Irving Silverman
Attorney

Patented June 16, 1953 2,641,853

UNITED STATES PATENT OFFICE 2,641,853

COLOR ANALYZING AND SYNTHESIZING DEVICE

Herbert W. Helding, Highland Park, Ill.

Application July 16, 1949, Serial No. 105,191

4 Claims. (Cl. 35—28.3)

This invention relates generally to a mechanical device capable of determining the percentage of certain colors which comprise a given composite color, or conversely, capable of producing the appearance of a composite color by means of predetermined percentages of said colors.

While not limited thereto, my invention is especially useful in the photoengraving art where it is desired to reproduce color photographs by means of half-tone plates, each representing a different one of a group of known process colors being used for printing the reproduction. Many other uses will be pointed out hereinafter, but emphasis will be placed upon the aforementioned use because of the extremely great saving in time, effort, and expense by the use of my device.

A typical method of making color reproduction half-tones by the presently used techniques requires great skill and judgment besides being tedious and time consuming. First a color positive is made from the original negative. This is the reference copy and must constantly be consulted for comparison throughout the entire process. Next, four color separation negatives are made. This is done by taking photographs of the copy using various filters which eliminate or enhance the various colors. The basic process colors used in photoengraving are usually black, blue, red and yellow, and this invention will be discussed as though such colors are being used, but it is desired to point out that the invention is capable of being used with a different number of colors.

Continuing with the description of the usual process, if the exposures for producing the four color separation negatives are perfectly correct, the correct percentage of the respective basic colors will appear as the percentage densities of the emulsions of the respective negatives. Following this, positives are made of the negatives so that the craftsman can more carefully judge whether the percentagewise separation of the color is accurate. The positives are dot etched or altered at this point in order to assist in the conformation, and as well-known this is a highly skilled art requiring utmost judgment. A contact print on copper for engraving or a contact print on zinc for offset is then made. The plate is now etched to obtain the half-tone printing plates made up of the familiar dots. The process must be carefully controlled throughout in an effort to obtain the proper dot size corresponding to the correct color percentage.

Now, the craftsman has four metal plates, representing the percentagewise separation of black, blue, red, and yellow. Theoretically the printing of all four plates upon a single sheet of paper and in perfect registration, with normal inking of standard color inks having the identical base colors as those upon which the percentages are based should result in a perfect reproduction of the copy color print, but this rarely, if ever, occurs.

There follows a long drawn out period of constant taking or drawing (as it is known in the trade) of four color registration proofs and alteration of the plates to attempt to cause the final print to conform to the copy. The plates have to be rubbed, burnished, re-etched, built up, and many, many proofs drawn. Often, the plates have to be entirely re-made. This process ties up the copy; keeps the shop equipment unnecessarily in use; occupies the full time of highly skilled and highly paid workmen; and not always results in a satisfactory final print.

One of the principal objects of this invention is to considerably reduce the time and expense involved, obtain better results, and enable less-skilled workmen to produce satisfactory half-tone color plates.

Another object of the invention is to enable simple standardization of colors, both basic and composite, whereby it is possible to determine the composition of a composite color, or perfectly reproduce a given composite color when the percentages of basic colors are known.

My invention provides a housing having mounted therein four cylindrical members each having two peripheral transparent bands or strips upon which are sequentially arranged sections of printed half-tone dots, graduated percentage-wise. Each member has a band of black dots and a band of dots of one of the process colors. Each member thus represents a color of the four basic process colors being used to obtain a reproduction or determine the percentages of a given composite color. Obviously the members representing black has both bands black. The sections of the black bands of each member (and only one of the black bands of the member representing the color black) are all provided with indicia giving the percentage represented by the section, both as to the black dots and colored dots of the parallel band on the other end of the member. Obviously circumferentially aligned sections of the parallel bands are intended to have dots representing identical percentages, albeit of different color.

The cylindrical members are all mounted independently to rotate upon a common axis. Each is rotatable to any one of a number of positions representing a percentage of color, and in any such position, all of the colored bands are superimposed with one section of each in alignment with a single section of each of the others and a window of the housing. This is the window which is intended to show the composite color. The housing has four additional windows, and the black section of each of the black bands of each member which corresponds to the percentage section appearing at the composite window will appear at the respective windows, alone, and without any other black or colored section. There is provided a fluorescent lamp illuminating all of the windows from the rear of the transparent portions of the members so as to provide as nearly as possible daylight illumination. Each of the members is arranged to cooperate with a detent mechanism to cause perfect alignment of any section with a window.

Thus, for any given composite color and position of the cylinders, at the five windows there will appear the following:

At the "composite" window there will appear a composite color made up of say *"a"* percent black half-tone dots, *"b"* percent blue half-tone dots, *"c"* percent red half-tone dots, and *"d"* percent yellow half-tone dots. The appearance of the color will be precisely as it would be printed from four half-tone plates of the respective percentages of half-tone colors. At the "black" window there will appear a section of half-tone black dots, whose size is identical to the size of the black dots of the section appearing at the "composite" window, as well as a notation reading the percentage *"a."* At the "blue" window there will appear a section of half-tone black dots, whose size is identical to the size of the blue dots of the section appearing at the "composite" window, as well as a notation reading the percentage *"b."* At the "red" window there will likewise appear a section of black half-tone dots of size corresponding to percentage *"c"* and at the "yellow" window there will appear a fourth section of black half-tone dots of a size corresponding to the percentage *"d."* Obviously there will be notations at each window stating what the percentages *"c"* and *"d"* are.

It will be seen that for any given setting of the device, the observer will have the composite color appearing before him exactly as it will print; there will appear four black half-tone sections each marked with a value which is the respective percentage of the color represented by its window which appears at the composite window; the four black half-tone sections will have respective dot size equal to the size of the colored dot appearing at the composite window.

Many objects and advantages will appear as a detailed description of the invention as set forth in connection with drawings of said embodiment in which.

Figs. 13 to 16 inclusive are diagrammatic views which show the orientations for the various colors on the colored band of each cylinder.

Figure 17:
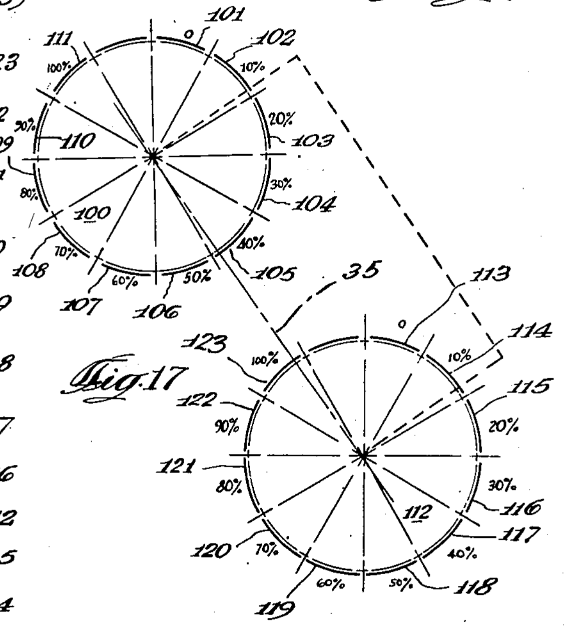

Fig. 17 is a schematic view showing the alignment of the sections of the parallel bands of a given cylinder with the symbolic representation used to indicate that the two bands move simultaneously.

Referring now to the drawings, the reference character 20 designates generally my new device, same comprising a housing formed with front and rear walls 21 and 22, a bottom wall 23, side walls 24 and 25, and an inclined top wall 26 with a horizontally disposed extension 27. The housing will be referred to collectively by the character 30 and is preferably formed of sheet metal, bent or stamped to formation and held together in any suitable manner, such as for example by the screws 31. Padded feet 32 are secured to the bottom wall 23 to prevent marring of polished surfaces. Louvres are provided at 33 in the front wall 21 and at 34 in the top wall extension 27 to provide ventilation for the interior of the housing 30.

Figure 3:
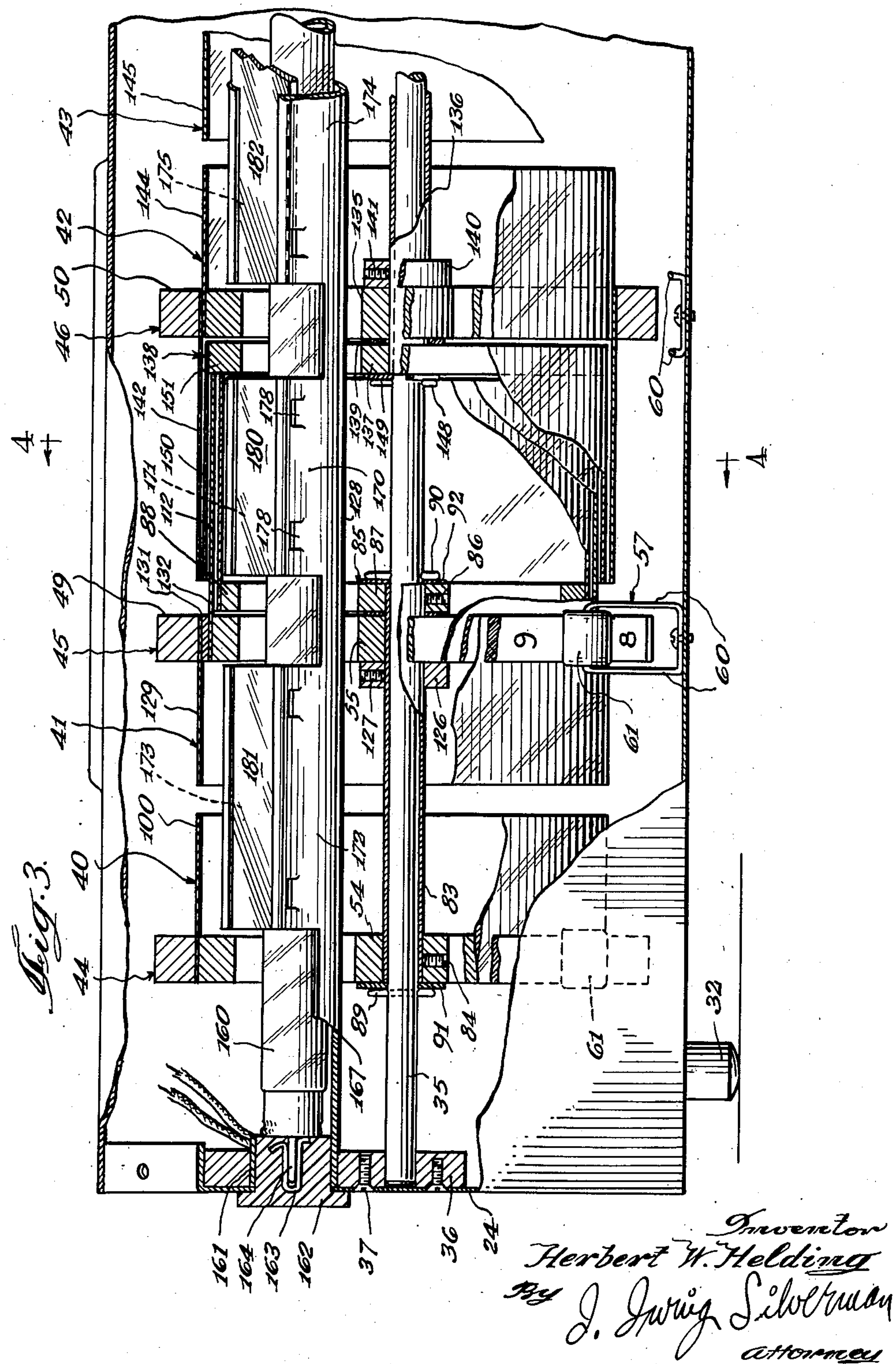
Fig. 3 is a sectional view of the device with portions broken away to show the details of construction thereof.
Figures 4, 5:
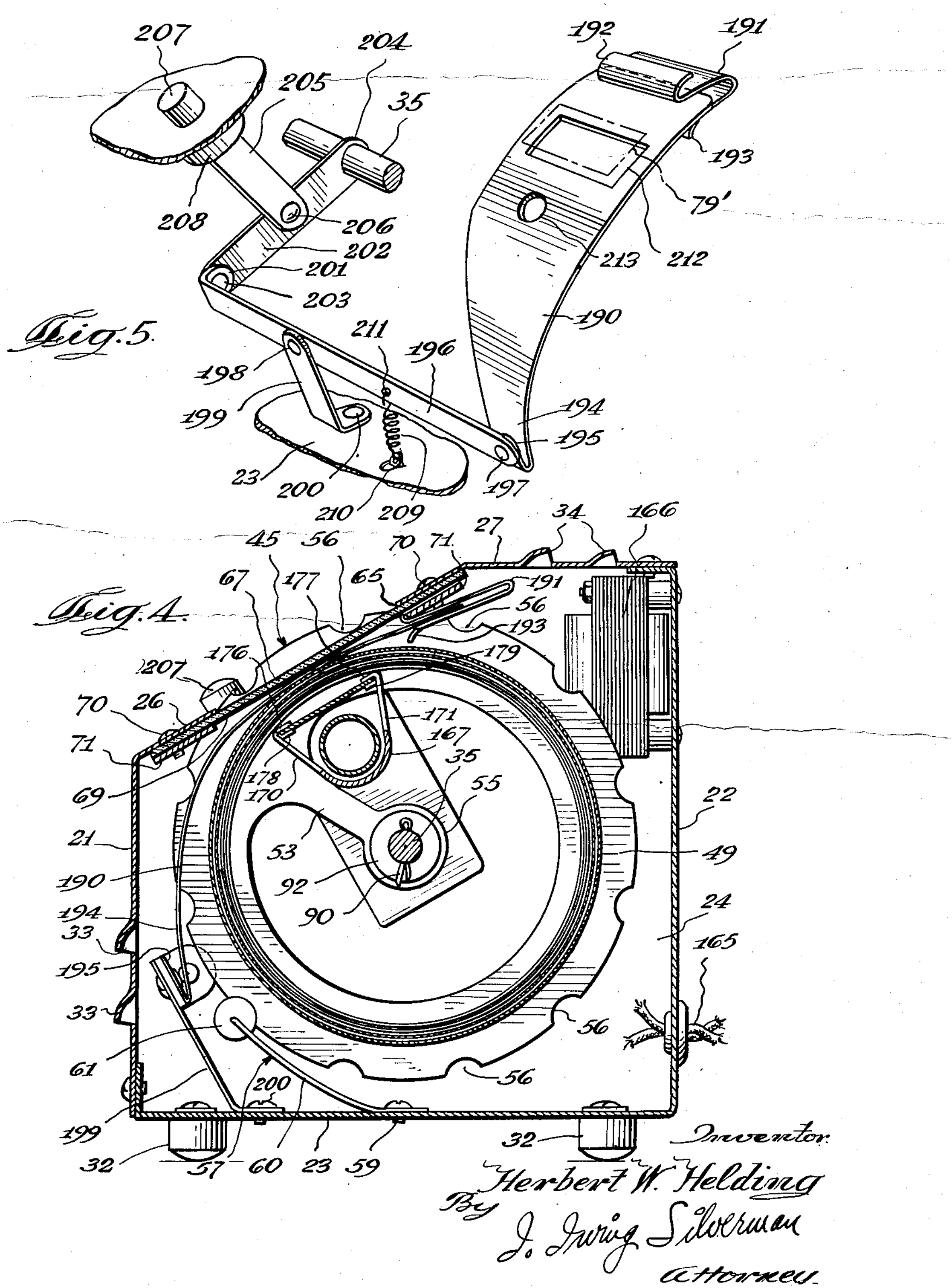
Fig. 4 is a sectional view taken through the device on the line 4—4 of Fig. 3 and in the indicated direction.
Fig. 5 is a perspective view of the linkage and mechanism for operating the masking device used to exhibit only a very small portion of the color appearing at the "composite" window.
Figure 6:
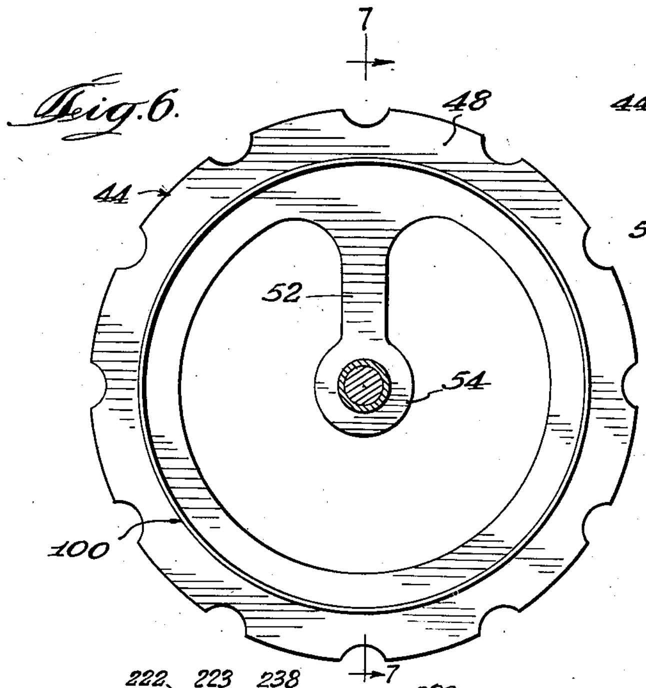
Fig. 6 is a sectional view taken on the cylindrical member axis and showing a side view of one of the member rotating and detent wheels.
Figure 7:
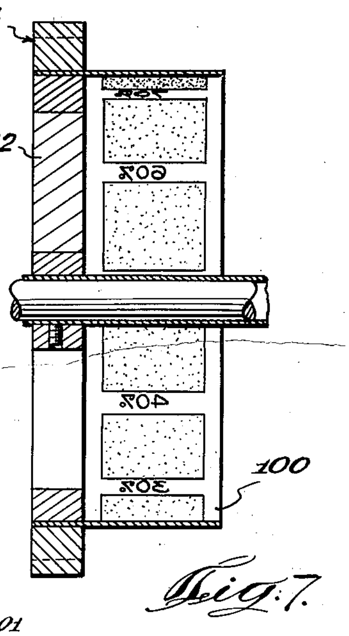
Fig. 7 is a partial sectional view through one of the members and its rotating and detent wheel.

Within the housing there is mounted a central fixed shaft 35 which extends from wall 24 to wall 25 along the length of the housing 35 and is mounted in hangers such as for example the collar 36 secured to the wall 24 by screws 37 as shown in Fig. 3. Mounted upon the shaft 35 for rotation relative thereto, and independent of each other, are provided four cylindrical members 40, 41, 42 and 43, representing respectively the colors yellow, red, blue, and black. Each member includes a manually movable detent wheel, as indicated respectively at 44, 45, 46 and 47. The wheels are constructed identically, and one is illustrated in Figs. 6 and 7. Each wheel has an annular rim portion, the rim portion of the wheel 44 being designated 48 and that of the wheel 45 being designated 49 (Fig. 4). The rim portions of wheels 46 and 47 are designated 50 and 51 respectively. The centers of the wheels are therefore substantially free and unobstructed, except for a single arm such as shown at 52 and 53 connected to its respective rim 48 and 49, each of which arms has a central hub 54 and 55 rotatable upon the shaft 35.

The rims 48, 49, 50, and 51 are provided with circumferentially spaced detent recesses 56 which are adapted to cooperate with spring pressed detent devices 57. All of the detent devices are identical and there is one provided for each of the wheels 44 to 47. As shown in Fig. 4, each detent device includes a flat base portion 58 secured to the bottom wall 23 by means of the screw 59 for example, and having a pair of curved arms 60 formed out of some resilient material such as for example, spring wire, and having a roller 61 rotatably mounted on the end thereof. The roller 61 is of such diameter as to engage within the detent recesses 56 and the arms 60 are biased to urge said roller against the periphery of the respective wheel. As will be seen from Figs. 3 and 4 the rollers 60 are arranged to align with the respective wheels.

The top wall 26 of the housing 30 has a rectangular opening provided therein as shown at 65 and extending throughout substantially the length thereof, but said opening is covered by three members 66, 67, and 68 in the manner shown in Fig. 4. In said Fig. 4 which is a sectional view taken through the device at the position of the member 67, there is shown a backing member 69 for the member 67 upon which may be printed indicia to be explained hereinafter. Thus the member 67 is preferably transparent and may be formed of glass or methyl methacrylate resin. The member 67, as are the other members 66 and 68, may be secured by means of screws such as shown at 70, passing through the wall 26, the member 67 and engaged within a strap or plate 71 upon the underside of the member 67. Such attaching means may be provided along upper and lower edges of the members 66, 67, and 68.

Figures 1, 2, 9:
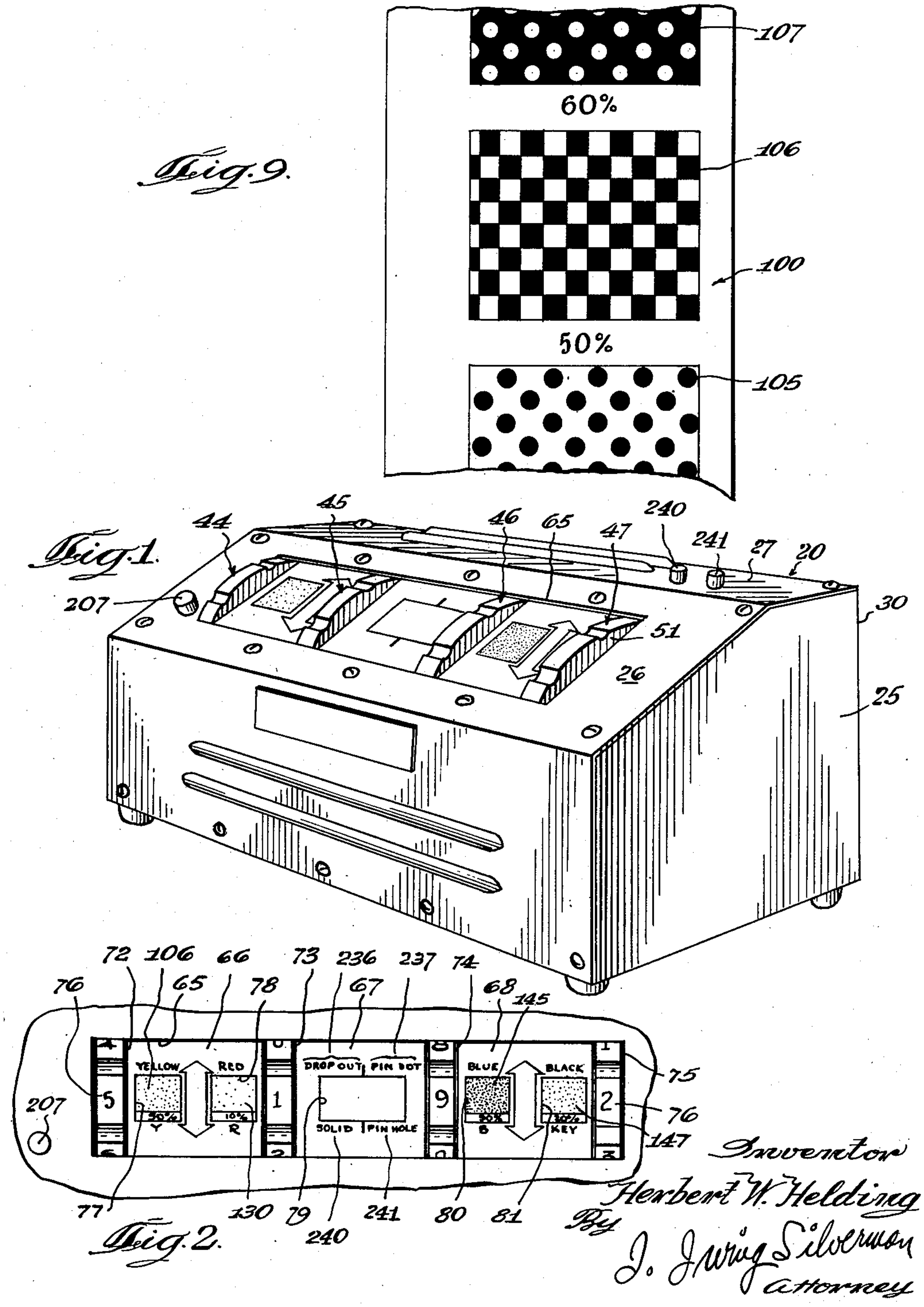
Fig. 1 is a perspective view showing a device constructed in accordance with my invention.
Fig. 2 is a partial plan view of the face of the device showing the windows thereof in detail.
Fig. 9 is an enlarged view to show the manner that the half-tone dots representing different percentages, are formed in the various sections of any band.

The members 66, 67, and 68 are of such size and spaced from one another and the ends of the rectangular opening 65 as to leave spaced slots 72, 73, 74, and 75. The slots 72, 73, 74 and 75 are aligned with the wheels 44, 45, 46, and 47 and a segment of each rim is adapted to protrude through the respective slots as shown in Fig. 1. Thus, it is possible to grasp the portion of each wheel protruding and rotate that wheel to any of the positions determined by the detent devices 57. The outer edges of the wheels between the detent recesses 56 are provided with numbers as shown at 76 for a purpose to be explained. There are five windows provided in the cover members 66, 67, and 68 as clearly shown in Fig. 2. The "yellow" window 77 is provided on the left side of member 66, while the "red" window 78 is provided on the right side of said cover member 66. The central cover member 67 has a single large "composite" window 79. In similar manner the cover member 68 is provided with a "blue" window 80 on the left and a "black" window 81 on the right. The detent devices 57 cooperate with the recesses 56 of the respective wheels so that when the roller 61 of any device is engaged within a recess 56, that wheel has a certain numeral 76 aligned with the window alongside the same.

Obviously, the windows above described may be formed in any other manner, and without the use of the cover members 66, 67, and 68, and the specific description is not intended to limit the invention.

For the sake of appearance as well as efficiency the operational face of the device is symmetrical as noted in Fig. 2, but obviously, if one realizes that there will be four transparencies superimposed beneath the "composite" window 79 as shown in Fig. 3, the constructions comprising the four cylindrical members 40, 41, 42, and 43 will not be symmetrical.

Hereinafter follows a description of the respective cylindrical members 40, 41, 42, and 43.

Figure 8:
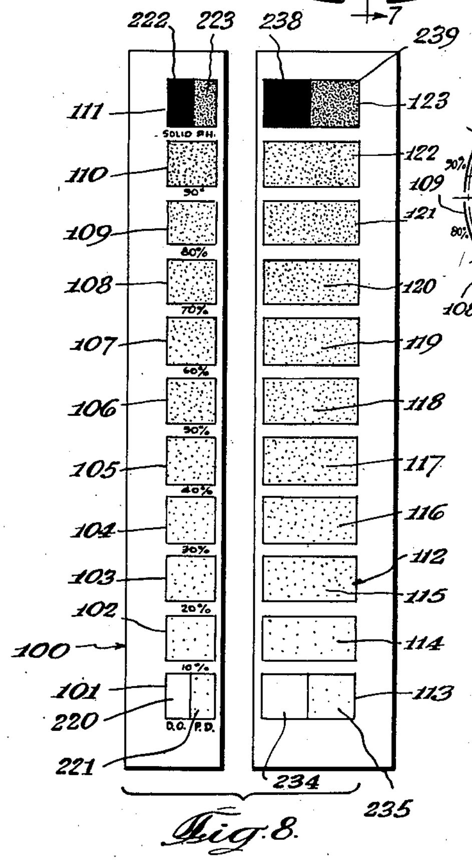
Fig. 8 is a developed view showing the bands carried by one of the cylindrical members.

The member 40 comprises a wheel 44 described hereinabove which is fixed to the left end of an elongated sleeve 83 by means of a set screw 84 or the like. At its right end, the sleeve 83 has a small wheel 85 secured thereto by the set screw 86 passing through the hub 87. The wheel 85, although smaller in diameter than the wheel 44 has the indentical construction, including a single arm (not shown) and an unobstructed space within the rim 88. The sleeve 83 is positioned upon the shaft 35 by means of the cotter pins 89 and 90 which pass through appropriate holes drilled in the shaft to accommodate the same. Associated anti-friction washers are indicated at 91 and 92. As shown in Figs. 6 and 7 the wheel 44 has a cylindrical transparent member 100 secured thereto about the rim thereof, concentric with the axis of the wheel 44 and spaced inwardly a sufficient distance so that the surface of the member 100 will not engage against the bottom surface of the cover member 66. A complete development of the member 100 is shown in Fig. 8, but same will be explained in connection with the manner of use of the device hereinafter.

The wheel 44 has been described as a single member, but it should be obvious to those skilled in the art that same may be formed of two separate members, an outer annular member comprising that portion of the rim 48 circumferentially outside of the member 100, and an inner wheel, having a diameter equal to the inner diameter of the member 100 and being provided with the hub 54 and the arm 52 and the remainder of the rim 48. The member 100 will thus be sandwiched between the nested portions making up the wheel 44. The drawings have shown this composite construction, but it is not desired to be limited thereby. For sake of clarity, the composite rim will be considered as a single rim 48 in the case of the wheel 44 and as the single rims 49, 50, and 51 of the respective wheels 45, 46, and 47.

The construction of the wheel 88 will thus be identical with the construction of the portion of the wheel 44 within the confines of the member 100.

The member 100 has a plurality of circumferentially aligned sections 101 to 111 inclusive which comprise printed rectangles adapted to align with the window 79 as the wheel 44 is rotated.

There is a second transparent cylindrical member 112 which is secured to the peripheral edge of the wheel 88 and is adapted to rotate therewith. The member 112 is also provided with rectangular printed sections 113 to 123 inclusive, which are of the same size as the sections of cylinder 100 considered in a circumferential direction, but which are twice as long as the sections of the member 100 considered in a direction parallel with the axis of rotation of the member 112. The sections of the member 112 are intended to align with and be seen through the window 79, and the diameter of the member 112 is such as to clear the inner surface of the cover member 67 and its backing member 69.

Rotation of the wheel 44 will cause simultaneous rotation of the transparent cylinders 100 and 112 by reason of the physical connection of the sleeve 83 between the wheels 44 and 88. Such rotation can therefore be considered as the rotation of a single cylindrical member designated generally 40.

The second cylindrical member is designated 41. Note that there is a considerable space between the wheels 44 and 88, and the wheel 45 of member 41 and its transparent cylinders are adapted to be located thereat. The wheel 45 is provided with a hub 55 loosely mounted upon the sleeve 83 so as to be rotatable relative thereto and independently of the wheel 44. There is a collar 126 secured to the sleeve 83 by the set screw 127 on one face of the hub 125, and an antifriction washer on the other face of the hub 55 between the hub 87 and said hub 55. It will be seen that the wheel is rotatable upon the shaft 35, but incapable of axial movement.

On the left surface of the wheel 45 and secured circumferentially about the rim 49 there is provided a transparent cylinder 129 whose construction is identical to the construction of the member 100. Obviously the sections, one of which is shown in Fig. 2 at 130 are adapted to align with the window 78. Again, as in the case of the wheel 44, the wheel 45 may be made up of composite sections, such as for example, an outer annular member having the detent recesses 56, and an inner wheel of smaller diameter carrying the arm 53 and the hub 55. These may be nested as shown in Fig. 3 with an annular spacer 131 between the transparent cylinders 129 and 132 carried by the wheel 45. The transparent cylinder 132 is secured to the rim 49 on the right hand side of the wheel 45 and has the identical construction as the transparent cylinder 112, albeit same is larger in diameter than the cylinder 112 to enable the cylinders to telescope one within the other and rotate independently without touching one another. Obviously the sections of the cylinder 132 (not shown) are intended to align with the window 79 in registry with sections of the cylinder 112.

If desired, the wheels 44 and 45 instead of being made up of nesting portions could be formed as integral members having circumferential grooves in the surfaces thereof within which may be secured the transparent cylinders hereinbefore discussed. It is desired to point out at this point that all of the cylinders of my invention are preferably formed as strips of transparent cellulose bent into such cylinders, but printed with the various sections in a manner to be described prior to formation.

Rotation of the wheel 45 will cause simultaneous rotation of both transparent cylinders 129 and 132 by reason of the attachment thereof to the respective surfaces of said wheel 45, and such rotation will therefore be considered the rotation of a single cylindrical member designated 41.

The next cylindrical member mounted upon the shaft 35 is the member 42 which is constructed somewhat like the member 41. There is provided a wheel 46 having a hub 135 which is loosely mounted upon a sleeve 136 (comprising a portion of the member 43) and fixed against axial movement along said sleeve by reason of the hub 137 of the wheel 138 and washer 139 on one side, and the collar 140 on the other. The collar 140 is secured to the sleeve 136 by a set screw 141. Upon the left surface of the wheel 46 and circumferentially mounted about the rim 50 is a transparent cylinder 142 larger in diameter than the similarly positioned cylinder 132 of the wheel 45. The cylinder 142 is otherwise identical in construction to cylinder 132 and has similar printed sections (not shown) also adapted to align with the window 79. Obviously the diameter of cylinder 142 is such as to clear the inner surface of the cover member 67, and its backing member 69. On its right hand surface, the wheel 46 has a second cylinder 144 secured to the rim and having a construction identical with the cylinder 100. There are rectangular sections which are adapted to align with the window 80, one of which is shown at 145 in Fig. 2.

Rotation of the wheel 46 will cause simultaneous rotation of both transparent cylinders 142 and 144 by reason of the attachment thereof to the respective surfaces of the said wheel 46 and such rotation will therefore be considered the rotation of a single cylindrical member designated 42.

At the extreme right as viewed in Fig. 3 there is provided the cylindrical member 43, only a portion of which is shown in said Fig. 3. Same is constructed substantially the same as the cylindrical member 40 except that the major portion of said cylindrical member 43 is to the left of the wheel 47, while the major portion of the cylindrical member 40 is to the right of the wheel 44. The wheel 47 has a cylinder 146 secured to the rim 51 on the left face thereof, the construction of said cylinder 146 being substantially identical to that of the wheel 100 and including rectangular sections adapted to align with the window 81, one of which is shown at 147 in Fig. 2. The hub (not shown) of the wheel 47 has secured thereto a sleeve 136 in the same manner that sleeve 83 is secured to the wheel 44 and may be prevented from moving axially of the shaft by cotter pins and washers at opposite ends of the sleeve 136. The left hand cotter pin and washer are shown at 148 and 149. The wheel 138 is mounted to rotate with the sleeve 136 and wheel 47 and has a cylinder 150 secured to its rim 151 upon the left hand face thereof, the cylinder 150 having substantially the same construction as the cylinder 112 albeit secured along an opposite edge. Sections (not shown) are provided upon the cylinder 150 adapted to align with the window 79. The construction of the wheel 138 is substantially identical with the construction of the wheel 88, albeit there is a slight difference in diameter to permit the cylinders of the respective wheels to telescope within one another without touching.

Rotation of the wheel 47 will cause simultaneous rotation of both transparent cylinders 145 and 150 by reason of the physical connection of the shaft 136 between wheels 47 and 138 and such rotation will therefore be considered the rotation of a single cylindrical member designated 43.

A fluorescent lamp 160 is intended to illuminate the windows 77 to 81 from the back thereof in order to provide as close to sunlight as possible. The left hand wall 24 is provided with a female socket 161 formed therein. A removable plug 162 is adapted to be carried by the socket 161, said plug 162 having contacts 163 on its inner end adapted to be engaged by the male contact prongs 164 of the lamp 160 for supporting said lamp 160. A similar plug is provided on the right hand wall 25, although not shown, for supporting the opposite end of the lamp 160. Electrical power is obtained by means of a conventional electrical power cord 165 connected in the usual way. A ballast is shown at 166. Note that the lamp extends through all of the members 40, 41, 42, and 43 and through the wheels of each member, whereby the members rotate about said lamp 160.

The socket 161 may be formed on the left end of an elongated protector and reflector member 167 having a generally concave bottom portion and being open along the top thereof. Said reflector member extends through the members 40, 41, 42, and 43 and is spaced from the lamp 160. Same serves as a stop to limit rotation of the cylindrical members 40, 41, 42, and 43 and prevents the arms such as for example, 53 or 52 from engaging against the lamp 160. In the spaces between the wheels 44 and 45, 45 and 46, and 46 and 47, the reflector member has tangential extensions of the sides thereof as shown at 170 and 171 in Fig. 4. The similar members between the outer pairs of wheels are designated 172 and 173, and 174 and 175. Since all are alike, a description of one pair of such extensions will suffice. Thus the extensions 170 and 171 have flanged edges 176 and 177 respectively, bent inwardly, and have a plurality of ears 178 and 179 on opposite extensions facing inwardly and cooperating with the flanges 176 and 177 respectively to form channels for the diffusing glass 180 disposed therein. The other diffusing glasses are designated 181 and 182, said glasses being positioned properly to illuminate all of the windows.

Prior to entering upon a description of the colored sections of the various transparent cylinders attention is directed to Fig. 5 in which is shown a simple mechanism enabling the composite color seen through the "composite" window 79 to be seen as a small disc of color instead of a large rectangle. It is often found that comparison with a small area of color gives a different apparent result than comparison with a large area. It is therefore desirable to provide a mechanism for quickly enabling practically all of the large colored area to be masked with the exception of a small area in the center thereof so as to make comparisons therewith.

As shown in said Fig. 5, there is provided a masking member 190 which is curved to fit around the front of the housing below the wall 26 and adapted to extend behind the cover member 67, between it and the cylinder 142. A stop member 191 is secured to the wall 26, for example, by securing a lip 192 thereof between strap 71 and the backing member 69 as shown in Fig. 4. There is a bottom lip 193 so that the free end of the masking member 190 is guided into the stop member 101 which is formed herein as a folded metal strip the folded end serving to stop movement of the masking member 190 upwardly and to the right as viewed in Fig. 5. The masking member 190 is somewhat wider than the window 79 at its top end, but tapers down to a narrow portion 194 bent upon itself at 195 to form an ear to which is pivotally secured a link 196 by means of the pivot 197. The link 196 is an elongate member pivotally supported intermediate its ends at 198 by the bracket 199 mounted upon the bottom wall 23 at 200. The end of the link 196 opposite the pivot 197 has a right angle bend forming an ear 201 pivoted to another link 202 at 203. The link 202 is pivotally mounted at the end opposite the pivot 203 to a member which is fixed relative to the housing 30. In the present instance it is the shaft 35 and for this purpose the end is formed with a loop 204 through which the shaft 35 passes. Intermediate its ends the link 202 is provided with a pivoted lever 205 pivotally secured at 206, and having a push button 207 secured to its upper end, said push button 207 protruding through the top wall 26 at the left end of the housing 30 and having a stop member 208 secured to the button engaging the bottom of the wall 26 to prevent the button from being pushed through the wall 26. Obviously the wall 26 has a passageway for the button 207 which can loosely move therein. The right hand end of the lever 196 is urged downwardly by the coiled spring 209 secured to the wall 23 at 210, and secured to the lever 196 at 211. This keeps the masking member 190 normally in the position shown in Fig. 5, with a rectangular opening 212 provided in the masking member in registry with the window 79. The outline of the window 79 is shown in broken lines at 79' in said Fig. 5. When the button 207 is pushed downwardly, the lever 202 rotates downwardly about the shaft 35, the lever 196 rotates in a counterclockwise direction about the pivot 198 against the effect of the spring 209, and the masking member 190 moves upwardly and to the right, until stopped by the stop member 191. At this point, a small perforation 213 is in registration with the center of the window 79 so that only a small disc of color can be seen therethrough.

Each of the cylindrical members 40, 41, 42, and 43 has two cylinders as explained, both moving simultaneously as the respective wheels are turned. The cylinders are all formed of half-tone colored sections printed upon the transparent material forming the cylinders. Half-tone plates are made by photographing subject matter through screens. In case the subject matter is a photograph, the various tones will cause various exposures on different parts of the same plate, and the etching of the plate will cause different sizes of dots caused by the interstices of the screen. In the case of a uniform color area, of course, the dots will be uniform, and the size thereof will depend upon the time of exposure and etching. By careful control, plates can be made of uniform color, having the dots thereof also uniform, and in different values of dots. In this manner, the sections of the various cylinders are made up of rectangles of half-tone color, having graduated values.

Referring to Fig. 8, the cylinder 100 has sections 102 to 110 which are half-tone color rectangles (in this case black, as will be explained) having respective values from 10% to 90%. The section 102 is preceded by a section 101 which comprises two halves 220, and 221. As noted, the section 220 has the notation "D. O." below it, and the section 221 has the notation "P. D." below it. Theoretically the section 101 should represent zero percent if the other sections are graduated by 10% each. In practice, however, there is no such thing as a zero percent half-tone plate. The smallest percentage dot is approximately 5% and this is referred to as "pin dot" and is shown in half 221. It is often advisable to cut out the half-tone dots of a plate, and in this case there actually are no dots whatever, but merely a blank space in the actual plate. This situation is called "drop out" and is represented in half 220 by a complete absence of color.

At the other end of the developed band shown in Fig. 8 as cylinder 100, the section 111 which would normally be 100% of color is shown having two halves 222 and 223. Again, there is no such thing as a 100% half-tone dot in practise. Instead there is a plate having maximum size of dots and color which is known as "pin hole" and is approximately 95% color. This is shown in half 223 which has the notation below the same "P. H." meaning pin hole. The left half 22 is printed from a solid member, and not as a half-tone, and is thus designated "Solid." Each of the sections 102 to 110 has the respective percentages of color indicated below the rectangular section. When any section appears at a window, the observer not only sees the color half-tone, but also the designatory indicia. Thus, in Fig. 2 it will be seen that section 106 appears at window 77, and the half-tone dots of the rectangular section are visible as well as the indicia below the same and reading "50%."

The cylinders 100, 129, 144, and 145 are all printed with sections identical with those shown in Fig. 8 on the left side of the figure, and designating the construction of cylinder 100. All half-tone sections for these cylinders are printed in black, although the sections of the respective cylinders align and register with windows 77, 78, 80 and 81 which represent and are marked respectively "Yellow," "Red," "Blue," "Black," as will be seen in Fig. 2.

In order to clarify the manner in which the half-tone sections are formed, there are shown in Fig. 9 three sections 105, 106, and 107 of the cylinder 100, corresponding respectively to 40%, 50%, and 60% half-tone areas. A fifty percent area will be half color and half blank, and hence the dots form a perfect checkerboard. The section 105 has ten percent less color, and hence the dots are slightly rounded, and the necks between the colored parts of the checkerboard are absent, thus rounding the dots and decreasing their size. In the case of the section 107, the solid portions of the checkerboard have run together causing the blank squares to become rounded, thereby providing the 60% half-tone area. The screen used in every case is identical, and the number of dots, their separation, and the rows are always identical. The differences lie in the size of the dots.

Figure 14:
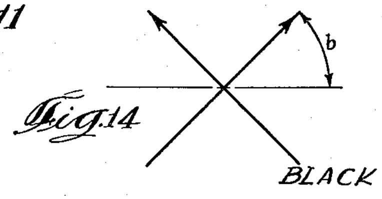
Figure 15:
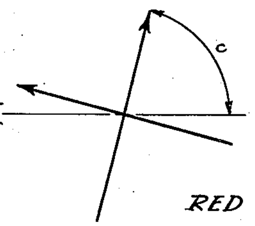
Figure 16:
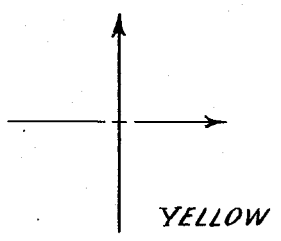

In printing half-tone colors, in the United States there are certain practises which are followed in the trade which can be taken into account by my device. The various colors are printed with the half-tone dots aligned in different manners producing thereby different screen patterns. By this it is meant that the coordinates of the screen used are changed in accordance with the color of the plate being made. Obviously the plates used in printing the sections of cylinder 100 had the lines thereof perfectly aligned with vertical and horizontal and hence the axes of the screen used in making the plates also aligned with vertical and horizontal. This represents a half-tone plate for the color yellow, and the symbolic alignment is shown in Fig. 16. The angle between the horizontal axis of the screen and true horizontal is obviously zero degrees. The screen in the case of the color red is rotated 15° clockwise, so that the angle "*c*" of Fig. 15 is 75°. This is then the symbolic alignment of the color red. The color black is shown in Fig. 14 with the screen axes at 45° corresponding to the angle "*b*." The color blue is produced in half-tone plates with the screen rotated 15° in a counterclockwise direction to give the angle "*a*" as 105°.

If desired, the sections of the cylinder 129 which represents the color red may be printed as 75° angle half-tones, the sections of cylinder 144 which represents the color blue may be printed as 105° angle half-tones, and the sections of the cylinder 145 which represents the color black may be printed as 45° angle half-tones. The purpose of showing all of these sections in the color black, however, is to facilitate the examination of the dots and the comparison thereof with the dots of a plate being processed. It is, therefore, immaterial as to the orientation of the rows of the dots, since the black areas of the sections are not used to obtain any composite colors.

Each of the cylinders 112, 132, 150, and 142, however has sections printed as rectangular half-tone colored areas. Taking first the cylinder 112, same is shown developed in Fig. 8. The sections are wider than those of cylinder 100 in order to enable the entire section to appear at the window 79. Again, the sections 114 to 122 inclusive are printed as half-tones having the values 10% to 90% inclusive, but in this case the half-tones are actually printed in the color yellow. The axis of orientation is 0° as explained. The section 113 has two halves, 234, and 235. The left half 234 is a yellow drop-out and hence perfectly blank, while the right half is a pin dot section and hence has 5% of yellow half-tone color. There are no indicia on the cylinder 112 similar to the numerals of cylinder 100. The designations "drop out" and "pin dot" are placed at 236 and 237 above window 79 and may be printed on the backing member 69. The section 123 has two halves 238 and 239 which are respectively solid yellow, and pin hole half-tone yellow. Indicia 240 and 241 below window 79 have the designations "solid" and "pin hole" to point this out.

In like manner, the cylinder 132 which is the mate of the cylinder 129 has graduated sections of red half-tone areas oriented the conventional 75° with end sections formed in red exactly as sections 113 and 123; the cylinder 142 which is the mate of the cylinder 144 has graduated sections of blue half-tone areas oriented the conventional 105° with end sections formed in blue exactly as sections 113 and 123; the cylinder 150 which is the mate of the cylinder 145 has graduated sections of black half-tone areas oriented the conventional 45° with end sections formed in black exactly as sections 113 and 123.

The cylinders and numerals 76 of each cylindrical member 40, 41, 42 and 43 are all matched as to percentages so that at the same position that a black half-tone section and its indicia appears at a small window, a large colored half-tone area of the identical percentage appears at the large window 79, while the wheel which moves the cylindrical member will have the edge bearing the indicia number corresponding to the percentage appearing above the wall 26. Thus, as shown in Fig. 2, with the wheel 72 set at the point where indicia 75 reads "5" corresponding to 50%, there appears at window 77 the 50% half-tone black section 106 with its indicia reading "50%," while at the window 79, the 50% yellow half-tone section 118 appears in registry with the predetermined colored sections of the other cylindrical members. Likewise, the wheel 45 is set at "1" which means that there is a black half-tone area of 10% value at the window 78 including the indicia "10%" and a 10% red half-tone area in registry with the window 79 and the yellow half-tone area; the wheel 46 is set at "9" which places a black half-tone area of 90% value at the "blue" window 80 including the indicia "90%" while there is a 90% blue half-tone section in registry with window 79 and the yellow and red sections; the wheel 47 is set at "2" which places a 20% black half-tone section at window 81 including indicia "20%" and a 20% black half-tone section in registry with window 79 and the already present yellow, red, and blue sections.

With the above described setting, if the lamp 160 is turned on (switch buttons are shown protruding from the top section 27 at 240 and 241) the observer will see through the window 79 a composite color made up of half-tone sections having values as follows:

50% yellow
10% red
90% blue
20% black and the composite color will have substantially the identical appearance as though it were printed from four plates having the half-tone values designated above.

With such setting, the observer can examine the size of the dots of the half-tone section representing each color at the respective windows 77, 78, 80, and 81. Since these sections are all in black, the comparison with the actual plate is a simple matter, enabling the observer to treat the plate for changing the size of the dots, etc. The notation "Key" under the "black" window is merely an indication that the black carries the principal parts of the color composition.

Figure 10:
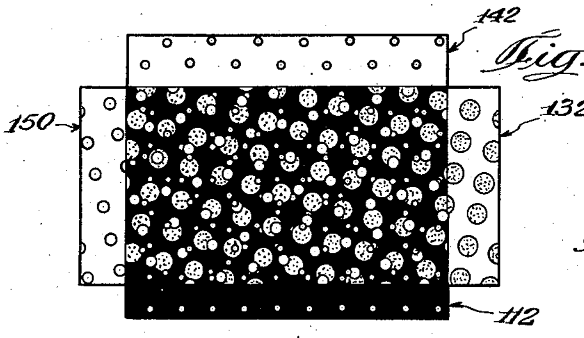
Fig. 10 is an enlarged plan view showing the general appearance of a composite color at the "composite" window, and showing the manner in which said color is made up of four half-tone sections.
Figure 13:
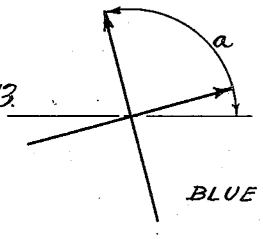

A symbolic representation of the mating cylinders of each cylindrical member is shown in Fig. 10 in order to demonstrate that the sections having the same percentages move simultaneously to identical positions.

The use of the solid, pin dot, pin hole, and drop-out sections is believed obvious. In any event, where a maximum or minimum percentage process color is used to form a composite color the observer has the effects produced by using half-tone maximum or solid at the same time, or the effects of using half-tone minimum or drop-out at the same time.

Figure 11:
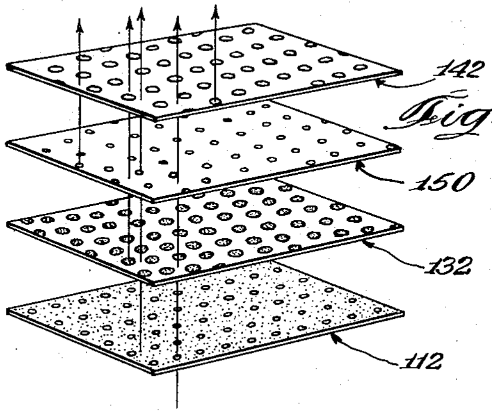
Fig. 11 is an exploded perspective view which shows how the half-tone sections printed on the transparencies are superimposed to provide an eventual composite color.
Figure 12:
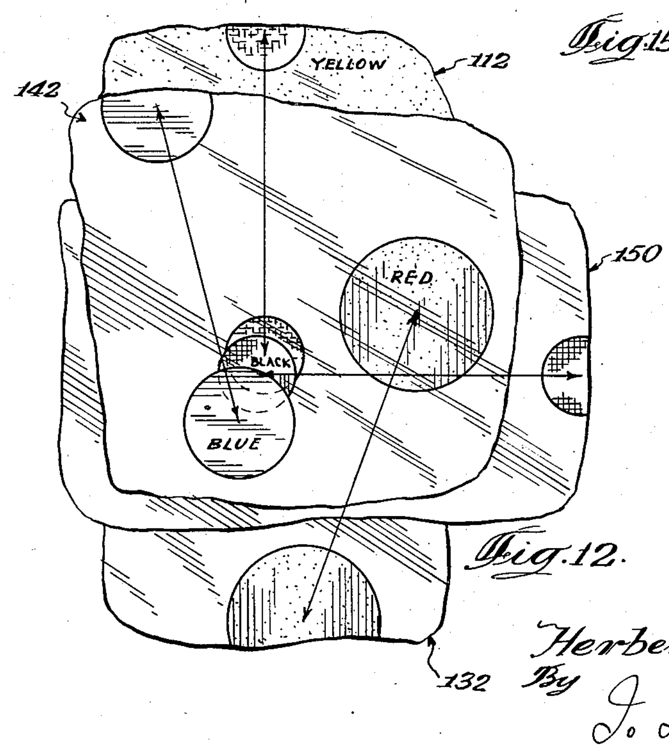
Fig. 12 is a greatly enlarged view showing the relative positions of the various colored half-tone dots of a composite color.

In Figs. 11 and 12 there is shown the manner that the various sections combine to produce a composite color. The sections from the colored cylinders 112, 132, 142, and 150 combine under the window 79, and the colored dots are aligned as shown in perspective in Fig. 11, as shown in greatly enlarged plan in Fig. 12, and as shown in general effect in Fig. 17 which is a plan view on an enlarged scale, although not as greatly enlarged as Fig. 12, of the composite color appearing at the window 79. Note from Fig. 12 that the distances between rows of dots is identical although the size of the dots may be different between sections, representing different percentages.

It will be noted that the order of colors reading from left to right on the device is yellow, red, blue and black. This is the order in which the colors are printed commercially. A given color can, therefore, be designated by a four digit number representing the numerals on the respective wheels. Thus, the color shown in the composite window 79 of Fig. 2 could be designated 5192, meaning that the composite color is composed of the percentages 50, 10, 90 and 20. In the construction of this device it was deemed more important to have the order of colors from left to right correspond to the usage than to have the central colored cylinders nest within one another in the printed order. As it happens, the only colors interchanged from conventional are the blue and black, but obviously a construction could be made in which the actual colors making up the composite color are arranged in the order of printing.

It is also desired to point out that the printed sections of all cylinders need not be made up of half-tone areas but could just as easily be made of tints applied in any desired manner, and further there need not be four cylindrical members, but there could just as easily be 3 or 2 or 5, etc.

With respect to the use of my device, obviously many uses suggest themselves at once. Artists would find use for the device to see the actual swatch of color reproducible from four process inks. Designers, especially those in the package field are able to show their clients a variety of color swatches and carry a complete campaign through, using the colors actually chosen by sight. Color photographers could use the device in order to determine how much or how little any of the colors vary from a desired effect, and in this case, the black cylindrical member is set at zero and the drop-out section is used. Engravers, lithographers and printers can use this device for checking and correcting color proofs, checking screen negatives and positives, checking production, and in many other ways. Furthermore, executives can follow carefully and accurately printing, engraving and photographic processes by means of this instrument.

It is believed that this invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of this invention as defined in the appended claims.

What is claimed and desired to be secured by Letters Patent of the United States is:

1. A device of the character described comprising a housing having one window designated as a composite color window and a plurality of other windows, a shaft in said housing, a plurality of wheels independently mounted for rotation on said shaft within the housing, said wheels being co-axially mounted on the shaft, means for rotating each wheel from outside the housing, each wheel having a pair of translucent cylindrical members rotatable therewith, one of each pair of cylindrical members having a peripheral band of a predetermined process color used in color printing and each said band having a plurality of colored areas of sequentially graded intensity, the second of each pair of cylindrical members having intensity and color identifying elements arranged parallel to the colored areas so as to rotate simultaneously therewith, said wheels being spaced along the shaft with the said first cylindrical member of each wheel in overlapping relationship one relative to the other and in registration with said composite window for viewing a composite color resulting from a single colored area of each first cylindrical member registering with said composite window and with the second cylindrical member of each wheel having its identifying elements adapted to register with one of said other windows, said wheels being rotatable so as to dispose a composite color opposite said composite window and the individual elements which make up the composite color, both as to intensity and kind, opposite said other windows.

2. A device of the character described comprising a housing having one window designated as a composite color window and a plurality of other windows, a shaft in said housing, a plurality of wheels independently mounted for rotation on said shaft within the housing, said wheels being co-axially mounted on the shaft, means for rotating each wheel from outside the housing, each wheel having a pair of translucent cylindrical members rotatable therewith, one of each pair of cylindrical members having a peripheral band of a predetermined process color used in color printing and each said band having a plurality of colored areas of sequentially graded intensity, the second of each pair of cylindrical members having intensity and color identifying elements arranged parallel to the colored areas so as to rotate simultaneously therewith, said wheels being spaced along the shaft with the said first cylindrical member of each wheel in overlapping relationship one relative to the other and in registration with said composite window for viewing a composite color resulting from a single colored area of each first cylindrical member registering with said composite window and with the second cylindrical member of each wheel having its identifying elements adapted to register with one of said other windows, said wheels being rotatable so as to dispose a composite color opposite said composite window and the individual elements which make up the composite color, both as to intensity and kind, opposite said other windows, said intensity and color identifying elements comprising printed half-tone swatches having predetermined dot sizes representing the percentage of color in the respective color area corresponding thereto, said color areas comprising printed color half-tone areas, each wheel having the areas of its said one cylindrical member of a different process color.

3. A device of the character described comprising a housing having plurality of windows of which one is designated a composite color window, a shaft in said housing and color analyzing means within the housing adapted to be illuminated and viewed through said windows, said means comprising a plurality of wheels, co-axially mounted and independently rotatable on said shaft, each wheel having two cylindrical translucent members with graded pigmented elements thereon similarly positioned circumferentially and movable simultaneously with said wheel, one of said two cylindrical members having its elements in standardized color with said elements differing in color, the other of said two cylindrical members having elements of a density identifying character, the cylindrical members having standardized color elements being of slightly different circumference, said wheels being spaced along the shaft with the cylindrical members having standardized color elements arranged in overlapping relationship one relative to the other and aligned with said composite color window to produce a composite color thereat and each of the said other cylindrical members aligned with one of the said other windows and spaced from its corresponding standardized color cylindrical member, and an elongate light source in the housing between the axis and the cylindrical members and extending through said wheels whereby to position said light source immediately behind the windows.

4. A device of the character described comprising a housing having one window designated as a composite window and a plurality of other windows, shaft means in said housing, a plurality of wheels independently mounted for rotation on said shaft means within the housing, said wheels being co-axially mounted on said shaft means, means for rotating each wheel from outside the housing, each wheel having a pair of translucent cylindrical members rotatable therewith, one of each pair of cylindrical members having a peripheral band of a predetermined process color used in color printing and each said band having a plurality of color areas of sequentially graded intensity, the second of each pair of cylindrical members having intensity and color identifying elements arranged parallel to the colored areas so as to rotate simultaneously therewith, said wheels being spaced along the shaft means with the first cylindrical member of each wheel in overlapping relationship one relative to the other and in registration with said composite window for viewing a composite color resulting from a single colored area of each first cylindrical member registering with said composite window and with the second cylindrical member of each wheel having its identifying elements adapted to register with one of said other windows, said wheels being rotatable so as to dispose a composite color opposite said composite window and the individual elements which make up the composite color, both as to intensity and color, opposite said other windows.

HERBERT W. HELDING.

References Cited in the file of this patent

UNITED STATES PATENTS

| Number | Name | Date |
|---|---|---|
| 329,078 | Phillips | Oct. 27, 1885 |
| 1,049,997 | Coe | Jan. 7, 1913 |
| 1,308,512 | Taylor | July 1, 1919 |
| 1,414,857 | Brandvein | May 2, 1922 |
| 2,120,499 | Mackay | June 14, 1938 |
| 2,196,271 | Olson | Apr. 9, 1940 |
| 2,476,580 | Bergman | July 19, 1949 |
| 2,522,723 | Rookyard | Sept. 19, 1950 |